July 23, 1935.  J. L. EDELEN  2,009,131
AUTOMOBILE CONTROL DEVICE
Filed Oct. 1, 1931
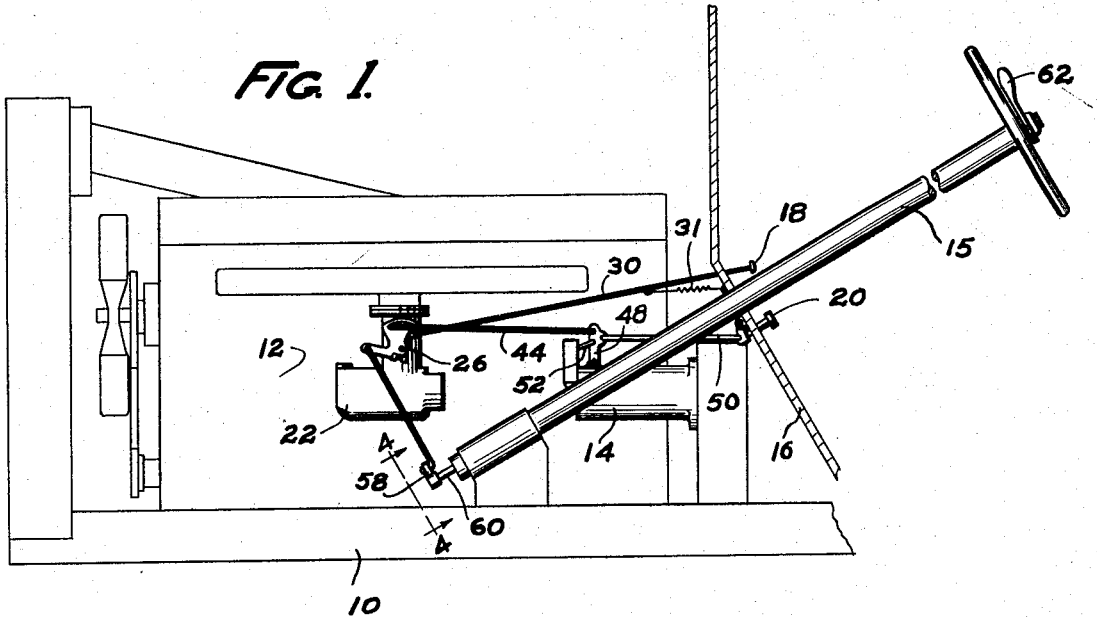
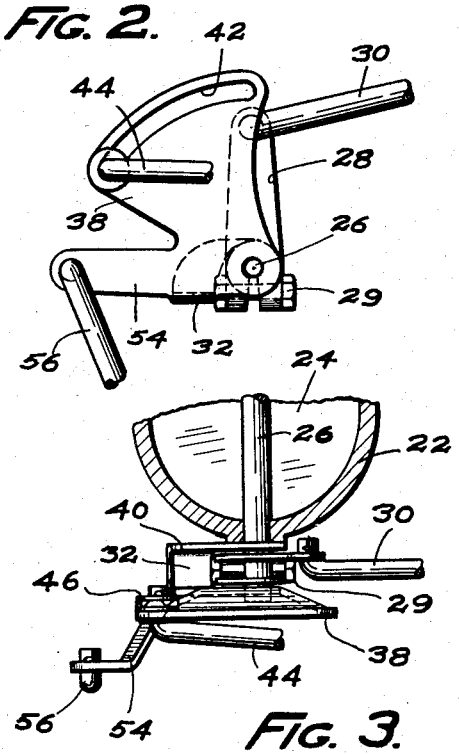
INVENTOR.
James L. Edelen
BY *J. R. McCrady*
ATTORNEY.

Patented July 23, 1935

2,009,131

UNITED STATES PATENT OFFICE 2,009,131

AUTOMOBILE CONTROL DEVICE

James L. Edelen, South Bend, Ind., assignor to Bendix Aviation Corporation, South Bend, Ind., a corporation of Delaware Application October 1, 1931, Serial No. 566,302

3 Claims. (Cl. 123—179)

This invention relates to automobile control devices and more particularly has reference to means for automatically opening the throttle of an automobile by the operation of the starter pedal.

The conventional accelerator pedal in an automobile, when not depressed, normally holds the throttle of the carburetor closed, and it is generally necessary in starting the engine to slightly open the throttle by the manual manipuation of a throttle control lever mounted on the steering wheel. This operation is often overlooked even by experienced drivers and makes the starting of the engine difficult, if not impossible. And even if not overlooked, it always constitutes an additional operation in starting which it is desirable to eliminate.

An object of this invention is to obviate the necessity of manually opening the throttle in starting by hooking it up with the starter pedal so that it will be automatically opened whenever the starter pedal is operated and will be maintained in its partially opened position until the operator closes it.

A further object of the invention is to provide means whereby actuation of the starter pedal will move the hand throttle control which, due to the friction of its mechanism, will remain open after the starter pedal mechanism is released, thus holding the throttle sufficiently open to permit the motor to run at higher than normal idling speed until the hand throttle control is moved to idling position by the operator.

With this and other objects in view which may be incident to these improvements, the invention consists in the combination and arrangement of elements hereinafter described and illustrated in the accompanying drawing, in which:

Figure 1 is a side elevation showing in outline a conventional automobile engine with my improvements attached thereto;

Figure 2 is a detail view showing a connecting plate in elevation;

Figure 3 is a plan view of the same; and

Figure 4 is a detail view of the connection to the steering column, corresponding to a view taken on line 4—4 of Figure 1.

In the drawing, the numeral 10 denotes the chassis of an automobile upon which is mounted an engine 12, a starting motor 14, a steering column 15, and floor boards 16. Protruding through holes in the floor boards are the conventional accelerating pedal 18 and the starter pedal 20. A carburetor 22 is mounted on the engine and is provided with the usual throttle valve 24 fixed to a shaft 26. To facilitate the showing of the drawing, a carburetor is illustrated as being on the same side of the engine as the steering column, but the invention is equally applicable to an automobile wherein the carburetor is on the opposite side of the motor, in which arrangement the throttle shaft 26 becomes a cross-shaft extending through or across the motor block to a throttle valve mounted at its opposite end.

A lever 28 is fixed to shaft 26 by means of an adjustable bolt and nut assembly 29 and has its free end pivotally connected to a rod 30 extending to the accelerating pedal 18 and normally held retracted by a spring 31. A connecting plate 38 is rotatably mounted on the shaft 26 by the means of a bracket 40 and has its upper portion bent outwardly away from the carburetor as shown in Figures 2 and 3 to avoid interference with the remainder of the carburetor mechanism. Plate 38 is provided with an arcuate slot 42 which slidably receives the bent end of a rod 44 held therein by a sliding washer 46. Rod 44 is connected at its other end to a rocker arm 48 mounted on the starter 14. Arm 48 is connected by means of a rod 50 to the starter pedal 20 and has a member 52 which, in the known manner, actuates the starter switch.

Plate 38 is provided with an integral arm 54 which is connected by means of a connecting rod 56 to the usual lever 58 on the steering column 15, lever 58 being connected by a rod 60 to the hand throttle lever 62. Bracket 40 is provided with a web 32 designed to abut against the bolt and nut assembly 29 so that the plate 38 when rotated in the counterclockwise direction will rotate lever 28 and actuate rod 30 against the force of spring 31 to open the throttle, but movement of lever 28 to the left as viewed in Figures 1 and 2 will not cause rotation of plate 38.

In operation, assuming the parts to be in the position indicated in Figure 1, the throttle being in its closed or idling position, the operator actuates starter pedal 20 in the usual manner, whereupon member 52 closes the starter switch, causing the engine to be driven by the starter. Arm 48 is rotated by rod 50 thus actuating rod 44, the forward end of which slides along groove 42 until it engages the forward end of the groove, after which it rotates plate 38 to the position shown in Figure 2, opening the throttle sufficiently to enable the engine to start and moving lever 58 and hand throttle 62 correspondingly, as well as moving the accelerating pedal 18. When the motor begins to fire the operator may move lever 62 back to its original position and control the throttle opening by means of the accelerating pedal 18, which opens the throttle without causing movement of plate 38 or the members connected thereto.

Although the invention has been described with reference to a particular embodiment thereof, it may be embodied in other forms without departing from the spirit of the invention as defined in the following claims.

I claim:

1. In a motor control device, a throttle, yielding means tending to close the throttle, foot actuated means for controlling the opening of the throttle, hand actuated means for controlling the throttle and the foot actuated means and having frictional resistance preventing its operation by the yielding means, starter actuating means, and means comprising an overrunning connection mounted on the throttle shaft connecting the starter actuating means and the hand actuated means whereby actuation of the starter actuating means moves the hand actuated means from closed position to a position corresponding to a partially opened position of the throttle.

2. In a motor control device, a throttle shaft, a throttle mounted thereon, a connecting member mounted on the shaft and rotatable relative thereto, manually operable frictional means connected to the connecting member to be actuated thereby, starter actuating mechanism having an overrunning connection with the connecting member, and a foot actuated throttle lever fixed to the throttle shaft and designed to abut against the connecting member to be moved thereby in one direction only.

3. In a motor control device, a throttle having a shaft, yielding means tending to close the throttle, foot operated means positively connected to the shaft for operating the same, hand operated means capable of moving the foot operated means and throttle toward open position only and having frictional resistance preventing its operation by the yielding means, and starter actuating mechanism having mounted on the throttle shaft an overrunning connection with the hand operated means to actuate the latter when the starter is actuated.

JAMES L. EDELEN